United States Patent
Maduranga et al.

(10) Patent No.: US 12,484,641 B2
(45) Date of Patent: Dec. 2, 2025

(54) SUPPORTING GARMENT ARTICLE AND METHOD OF PRODUCING A SUPPORTING GARMENT ARTICLE

(71) Applicant: SILUETA (PRIVATE) LIMITED, Battaramulla (LK)

(72) Inventors: Shashika Maduranga, Battaramulla (LK); Nadeekha Leanage, Battaramulla (LK)

(73) Assignee: SILUETA (PRIVATE) LIMITED, Battaramulla (LK)

( * ) Notice: Subject to any disclaimer, the term of this patent is extended or adjusted under 35 U.S.C. 154(b) by 0 days.

(21) Appl. No.: 17/801,482

(22) PCT Filed: Feb. 25, 2021

(86) PCT No.: PCT/SG2021/050093
§ 371 (c)(1),
(2) Date: Aug. 22, 2022

(87) PCT Pub. No.: WO2021/173081
PCT Pub. Date: Sep. 2, 2021

(65) Prior Publication Data
US 2023/0088813 A1    Mar. 23, 2023

(30) Foreign Application Priority Data
Feb. 25, 2020   (SG) ............................. 10202001634S (51) Int. Cl.
*A41C 3/10*   (2006.01)
*A41C 3/00*   (2006.01)
(Continued)

(52) U.S. Cl.
CPC .............. *A41C 3/10* (2013.01); *A41C 3/0007* (2013.01); *A41C 3/0014* (2013.01); *A41C 5/005* (2013.01);
(Continued)

(58) Field of Classification Search
CPC ...................................................... D06N 3/128
See application file for complete search history.

(56) References Cited

U.S. PATENT DOCUMENTS 2,106,132 A * 1/1938 Feinbloom ............... D06Q 1/10
450/156
7,862,401 B2 * 1/2011 Watrin .................. A41C 3/0014
450/39
(Continued)

FOREIGN PATENT DOCUMENTS

DE   102011002192 A1 * 10/2012 ............. A41B 9/001
EP      3153040 A1     4/2017
(Continued)

OTHER PUBLICATIONS

Machine Translation of DE 102011002192 A1, provided via Espacenet Patent Translate on Feb. 6, 2025 (Year: 2025).*
(Continued)

*Primary Examiner* — Jocelyn Bravo
(74) *Attorney, Agent, or Firm* — Fletcher Yoder, P.C.

(57) ABSTRACT

A supporting garment article such as a brassiere comprises a layer of elastomer provided in a graduating manner such that the area density of the elastomer vanes across a first region of the garment article. Supporting garment articles of the present disclosure provide the support of a constructed bra while maintaining the comfort factor of an unconstructed bra such as a bralette. The present disclosure provides a superior medium support bra using graduated application of an elastomer such as silicone, bonding, extrusion and dry moulding techniques.

9 Claims, 7 Drawing Sheets

(51) Int. Cl.
*A41C 5/00* (2006.01)
*A41D 31/18* (2019.01)
*D06M 15/643* (2006.01)
*D06M 15/693* (2006.01)
*D06M 23/16* (2006.01)
*D06N 3/12* (2006.01)
*D06Q 1/14* (2006.01)

(52) U.S. Cl.
CPC ......... *A41D 31/185* (2019.02); *D06M 15/643* (2013.01); *D06M 15/693* (2013.01); *D06M 23/16* (2013.01); *D06N 3/128* (2013.01); *D06Q 1/14* (2013.01); *A41B 2500/52* (2013.01); *D06N 2211/10* (2013.01)

(56) References Cited

U.S. PATENT DOCUMENTS

| | | | | |
|---|---|---|---|---|
| 8,317,567 | B2* | 11/2012 | Watrin | A41C 5/005 450/39 |
| 8,480,452 | B2* | 7/2013 | Reinisch | A41C 3/0057 450/39 |
| 9,456,638 | B2* | 10/2016 | Abbott | A41C 3/10 |
| 9,468,241 | B2* | 10/2016 | Harber | A41B 11/003 |
| 9,883,702 | B2* | 2/2018 | Martinet | A41C 3/10 |
| 2004/0029485 | A1* | 2/2004 | Pagliarulo | A41C 3/0007 450/1 |
| 2006/0223415 | A1* | 10/2006 | Watrin | A41C 5/005 450/39 |
| 2009/0098803 | A1* | 4/2009 | Reinisch | A41C 3/0014 450/86 |
| 2009/0181599 | A1* | 7/2009 | Farmer | A41D 31/00 450/86 |
| 2011/0076408 | A1* | 3/2011 | Watrin | A41C 5/005 427/387 |
| 2011/0143634 | A1* | 6/2011 | Sokolowski | A41C 3/0057 450/39 |
| 2014/0082815 | A1* | 3/2014 | Harber | A41D 31/185 2/69 |
| 2015/0024658 | A1* | 1/2015 | Abbott | A41C 3/14 450/39 |
| 2015/0038052 | A1* | 2/2015 | Hays | A41C 1/12 450/156 |
| 2016/0227846 | A1* | 8/2016 | Funk-Danielson | A41C 3/128 |
| 2017/0000195 | A1* | 1/2017 | Harber | A41D 31/185 |
| 2017/0099884 | A1* | 4/2017 | Martinet | A41C 3/10 |
| 2017/0290376 | A1* | 10/2017 | Maheshwari | D04B 21/207 |
| 2019/0082751 | A1 | 3/2019 | Young | |
| 2021/0071357 | A1* | 3/2021 | Farmer | B32B 27/40 |

FOREIGN PATENT DOCUMENTS

WO 2016127155 A1 8/2016
WO 2019161533 A1 8/2019

OTHER PUBLICATIONS

International Preliminary Report on Patentability for PCT Application No. PCT/SG2021/050093, Mailed Sep. 9, 2022, 9 Pages.

* cited by examiner

SUPPORTING GARMENT ARTICLE AND METHOD OF PRODUCING A SUPPORTING GARMENT ARTICLE

FOREIGN PRIORITY INFORMATION

This application claims priority to PCT application number PCT/SG2021/050093, filed Feb. 25, 2021, which claims priority to Singapore patent application number 10202001634S, filed Feb. 25, 2020.

TECHNICAL FIELD

The present disclosure relates to garment articles and methods of manufacturing a garment article. The garment article may take the form of a total garment such as brassiere, components of a garment, or parts which in combination form a component of a garment.

BACKGROUND

The listing or discussion of a prior-published document in this specification should not necessarily he taken as an acknowledgement that the document is part of the state of the art or is common general knowledge.

A traditional bra consists of a bra wire and material to provide compression on required areas. Usually these components result in additional forces on body which compromise the comfort for the wearer. It has been found from analysing the market trends and consumer feedback that the millennials who used to wear bralettes which may also be referred to as unconstructed bras or wire free bras want more support with their ageing, however they don't prefer constructed bras because of the comfort given by the bralette.

Thus, there is a requirement for a garment that gives the support of a constructed bra while maintaining the comfort factor of the bralette.

SUMMARY

According to a first aspect of the present disclosure, a supporting garment article comprises a layer of elastomer provided in a graduating manner such that the area density of the elastomer varies across a first region of the garment article.

The garment article may, for example be a brassiere or a portion of a brassiere. Because the elastomer is provided in a graduating manner the elasticity the garment article also varies in a graduating manner. This allows the fit performance of the garment to be improved.

The layer of elastomer may be provided as a mesh or a foam having a varying density.

In an embodiment the supporting garment article further comprises a fabric layer. The layer of elastomer may be bonded to a surface of the fabric layer in the first region.

A portion of the fabric layer may be moulded, for example to form bra cups.

In an embodiment, the elastomer is arranged in the form of a pattern, wherein the pattern gradually varies across the first region such that a ratio of a proportion of the surface to which elastomer is bonded to a proportion of the surface to which no elastomer is bonded varies across the first region.

The elastomer may comprise silicone.

In some embodiments, a layer of flock covering the layer of elastomer is provided. The flock may comprise nylon.

In some embodiments, the supporting garment article further comprises a second elastomeric layer comprising an elongate portion of elastomer bonded to a surface of the fabric layer. The elongate portion of elastomer may be configured to provide additional support for the body part of the wearer. The elongate portion of elastomer may form an underwire portion. The underwire portion may be an extruded elastomeric underwire. The second elastomeric layer may comprise silicone. The second elastomeric layer may be covered by a layer of flock. The flock may comprise nylon. The elongate portion of elastomer may be configured to maintain the shape of the supporting garment article when in use.

The supporting garment article may be a brassiere which comprises a wing component. The wing component may comprise an engineered print.

The layer of elastomer may be provided to restrict the stretchability of a portion of the supporting garment article. For example, the supporting garment article may comprise a bottom band formed by a variation in stretch across the garment.

According to a second aspect of the present disclosure, a method of producing a supporting garment article is provided. The method comprises: applying elastomer to a surface of a first region of a fabric substrate, such the elastomer is arranged in a graduated manner; curing the applied elastomer so that it is secured to the surface of the first region of the fabric substrate, and subsequent to the curing of the elastomer, moulding the fabric substrate.

The fabric structure may be moulded by dry moulding.

In an embodiment, the elastomers applied to the surface of the first region of the fabric layer in the form of a pattern, wherein the pattern gradually varies across the first region such that a ratio of a proportion of the surface to which elastomer is applied to a proportion of the surface to which no elastomer is applied varies across the first region.

In an embodiment, applying elastomer to the surface comprises depositing the elastomer in its wet form on a first substrate.

The method may further comprise after curing the elastomer but before moulding, applying further elastomer in elongate form to the surface of the fabric substrate and curing the applied further elastomer. The application of the elastomer in elongate form may comprise extruding elastomer onto a surface of the fabric substrate. The method may further comprise after applying the further elastomer but before curing the applied further elastomer, flocking the applied further elastomer. Flocking the applied further elastomer may comprise flocking the applied elastomer with nylon.

BRIEF DESCRIPTION OF THE DRAWINGS

In the following, embodiments of the present invention will be described as non-limiting examples with reference to the accompanying drawings in which.

DETAILED DESCRIPTION

According to a first aspect of the present disclosure there is provided a supporting garment article comprising: a layer of elastomer provided in a graduating manner such that the area density of the elastomer varies across a first region of the garment article.

According to a second aspect of the present disclosure, there is provided a method of producing a supporting garment article, the method comprising: applying elastomer to a surface of a first region of a fabric substrate, such the elastomer is arranged in a graduated manner; curing the applied elastomer so that it is secured to the surface of the first region of the fabric substrate; and subsequent to the curing of the elastomer, moulding the fabric substrate.

In embodiments herein, the word "comprising" may be interpreted as requiring the features mentioned, but not limiting the presence of other features. Alternatively, the word "comprising" may also relate to the situation where only the components/features listed are intended to be present (e.g. the word "comprising" may be replaced by the phrases "consists of" or "consists essentially of"). It is explicitly contemplated that both the broader and narrower interpretations can he applied to all aspects and embodiments of the present invention. In other words, the word "comprising" and synonyms thereof may be replaced by the phrase "consisting of" or the phrase "consists essentially of" or synonyms thereof and vice versa.

The elastomer may be arranged such that the area density of the elastomer on the fabric layer is graduated across the first region in order to vary the elasticity of the garment and provide support to a body part of the wearer.

In some embodiments, the graduation of the elastomer is achieved by means of the elastomer being bonded to the surface of the first region of the fabric layer in the form of a pattern, wherein the pattern gradually varies across the first region such that the ratio of the proportion of the surface to which elastomer is bonded to the proportion of the surface to which no elastomer is bonded varies across the first region. For example, the pattern may comprise a series of intersecting lines, with the distance between the lines decreasing gradually in a given direction across the fabric. Other patterns or means of obtaining a variation in the area density of the elastomer may be employed according to embodiments. For example, the elastomer may be provided as a mesh or foam having a density which varies in a given direction across the elastomer.

In some embodiments, the elastomer may be provided between two piles of fabric in the garment article. In other embodiments, the elastomer may be provided with a flock to form part of the garment article such as wings or straps of a bra. Thus, the graduated elastomer may be provided without a fabric layer.

Such a graduated arrangement of elastomer is advantageous as it enables the garment article to provide support to a body part while maintaining comfort. The arrangement of elastomer may enable the garment to provide directional support to a body part while maintaining comfort.

The elastomer may be secured to the fabric by first applying the elastomer to a substrate. When an elastomer such as silicone is applied to the substrate in its wet form, a temporary bond with the substrate is created. This becomes a permanent bond upon curing.

In embodiments, the elastomer may comprise silicone, however, other suitable elastomers are well known in the art.

In an embodiment viscosity of elastomeric material for application to the fabric in a graduated arrangement is approximately 100,000 cps. In an embodiment, the elastomeric application should achieve a weight in the range 50-250 gsm. In an embodiment the elastomeric application should achieve a weight in the range 50-400 gsm. This ensures that sufficient support is provided to the body part by the applied elastomer. Preferably, the Peel bond value of the graduated elastomer is greater than 200 grams. More preferably the Peel bond value of the graduated elastomer is greater than 300 grams.

The fabric may be single-ply or two or more-ply fabric. Further materials may be inserted between plies of the fabric in order to provide additional beneficial features to the garment. For example, a bra cookie may be inserted between the fabric layers of a brassiere in order to ensure nipple concealment when the brassiere is worn.

In an embodiment, the supporting garment article may further comprise one or more regions of elongate portions of elastomer on a surface of the fabric. The elongate portions of elastomer may be provided between two plies of fabric in a multi-ply fabric. The supporting garment article may include any functional material (for example, membranes, meshes, polymetric materials, and/or a layer of nylon lace) in between the layers of material which constitute the product. In an embodiment, the supporting garment article may further comprise one or more regions of extruded elastomer on a surface of the fabric. In an embodiment, the extruded elastomer provides support to a body part in combination with the graduated elastomer. In an embodiment, the extruded elastomer supports the fabric so that the garment article maintains its form when worn. In an embodiment, the supporting garment article comprises regions of extruded elastomer that provide support to a body part and other regions of extruded elastomer that support the fabric so that the garment article maintains its form when worn.

In an embodiment, the garment article is a brassiere and an underwire portion is formed from extruded elastomer. The extruded elastomer and the graduated elastomer provide support to the breast. In another embodiment, the garment article is a brassiere and extruded elastomer is provided across the wing portion of the brassier. This advantageously avoids collapsing of the wing portion of the brassier and provides enhanced support. In another embodiment, extruded elastomer is provided both to form an underwire portion and across the wing portion of the brassiere.

In an embodiment, the graduated elastomer is applied to the surface of the fabric and cured prior to the application of the extruded elastomer. This is advantageous because it enables precise positioning of the extruded elastomer with respect to the graduated elastomer in order to ensure optimal support of the relevant body part.

In an embodiment, a layer of flock may cover one of more elongate layers of elastomer. Advantageously, this provides increased comfort to the wearer. In an embodiment, the flock may comprise nylon, polyester, cotton, viscose, rayon, wool. In an embodiment, nylon is preferred due to having a soft hand feel. In an embodiment, the flock is applied after the application of the elongate or extruded layer of elastomer. In an embodiment, the flock is applied prior to curing of the elongate or extruded layer of elastomer. In an embodiment, the material chosen for flocking may be chosen according to the conditions under which dry moulding will be performed, in order to prevent damage to the flock during the moulding process.

In an embodiment, a supporting garment article is provided, the article comprising: a fabric layer, at least a portion of which is moulded; and an elastomeric layer comprising an elongate portion of elastomer bonded to a surface of the fabric layer. The elastomeric layer may form an underwire portion. The elastomeric layer may form an underwire portion for a brassiere. The elastomer may comprise silicone.

Figure 1:
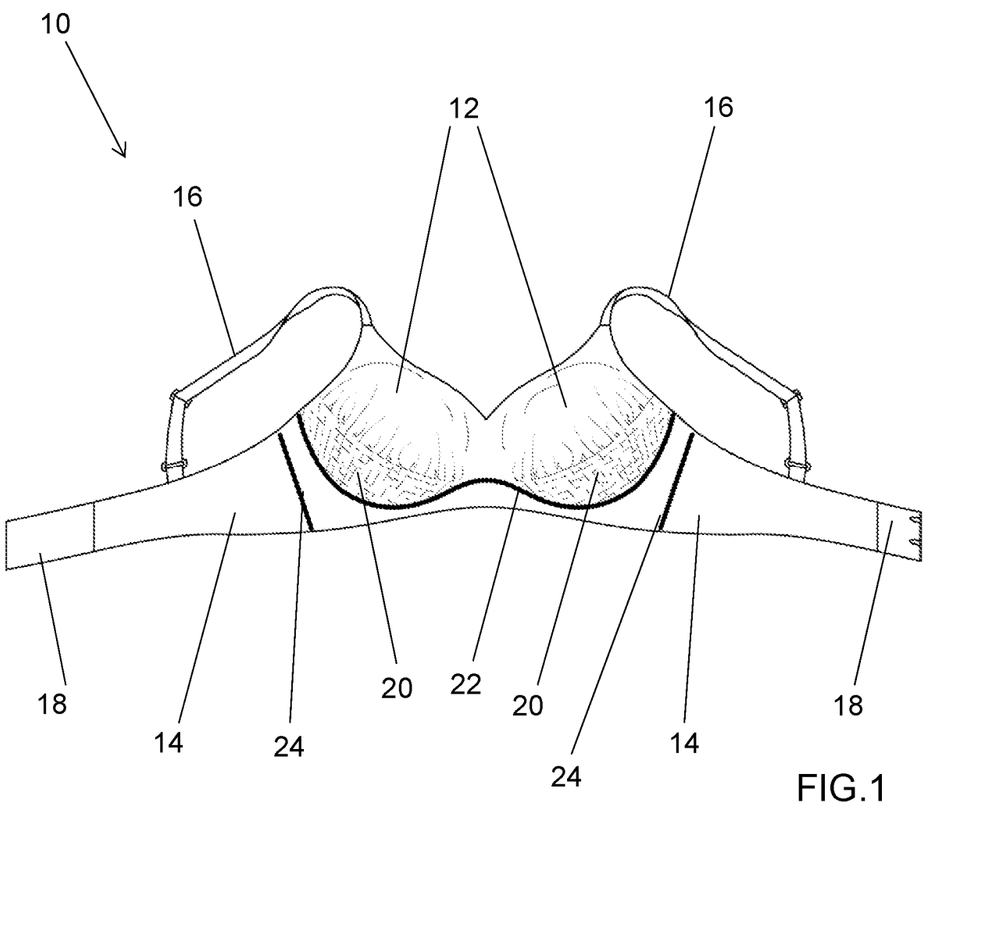
FIG. 1 shows a garment article according to an embodiment of the present invention.

FIG. 1 shows a garment article according to an embodiment of the present invention. The garment article 10 is a brassiere. The brassiere 10 is formed from a fabric material and comprises two bra cups 12. The bra cups 12 support the breasts of the wearer when the brassiere 10 is worn. Bra wings 14 extend from the sides of the bra cups 12. A closure 18 is provided on the end of each of the bra wings 14 to fasten the brassiere 12 around the wearer. The closure 18 may take the form of a hook and eye. Bra straps 16 are attached to the top of each of the bra cups 12 and to the bra wings 14. The bra straps 16 fit over the shoulders of the wearer when the brassiere 10 is worn.

In the embodiment shown in FIG. 1, a moulded portion 20 is formed at the lower part of the bra cups 12. The moulded portion 20 may be formed by dry moulding and is provided with dimples. In this embodiment, dry moulding has not only been employed to form the cup shape of the brassiere but dimples on the cup have also been formed. These dimples both enhance the support provided by the cup and enhance the aesthetic appeal of the garment.

An underwire 22 runs under both of the bra cups 12. The underwire 22 is formed from an elastomer material which may be extruded onto the fabric forming the brassiere. The underwire 22 may be covered by a flocking material. Additional supporting ribs 24 are provided running across the bra wings 14. The supporting ribs 24 are formed from an elastomer material. The supporting ribs 24 increase the rigidity of the wings of the brassiere 10 in the vertical direction and avoid collapsing & provide enhanced support to the brassiere 10.

The brassiere 10 is provided with a layer of elastomer in a region or several regions. The layer of elastomer is provided in a graduated manner such that the area density of the elastomer varies across the region or regions of the brassiere 10. Since the elastomer affects the elasticity of the brassiere 10, the graduated elastomer results in a varying elasticity of the brassiere 10 across the regions to which it is applied.

The graduated elastomer may be applied to the lower parts of the bra cups 12 and or the bra wings 14. The graduated elastomer may be applied such that the area density is higher along the bottom edge of the bra wings 14 and the bottom of the bra cups 12. This provides for improved fit performance of the brassiere.

The graduated elastomer may be applied to form a band at the lower edge of the brassiere. This restricts the stretch of the brassiere at the bottom band.

The bra wings 14 may be provided with an engineering print to enhance the visual appeal of the garment article.

The elastomer layer may be applied to the fabric forming the brassiere 10 in a graduated manner, for example by application in a pattern having a varying area density. In other embodiments, the elastomer may be provided as a separate layer, for example as a mesh or foam having an area density which varies. Such a layer may be integrated into a garment between fabric layers of the garment. In some embodiments, the elastomer layer may form parts of the garment, such as the bra wings without a fabric layer. In such embodiments, parts of the garment are formed by the elastomer layer alone or with a flocking material applied to the elastomer layer.

An example method of manufacturing a garment article such as a brassiere according to an embodiment of the present invention will now be described with reference to FIG. 2A to FIG. 2J. FIG. 2A to FIG. 2J show steps in a method of producing a garment article according to an embodiment of the present invention.

Figure 2A:
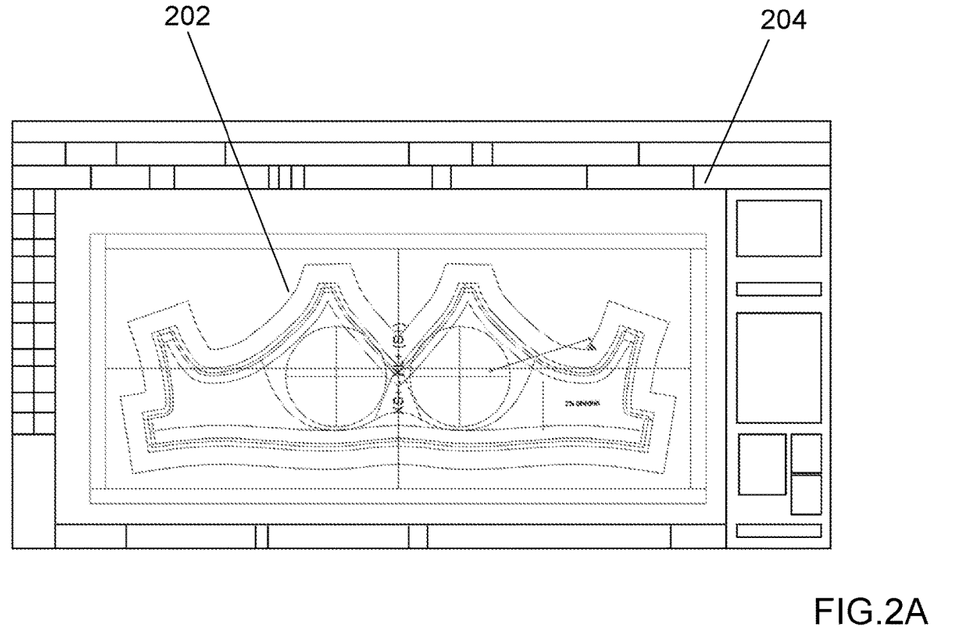
FIG. 2A to FIG. 2J show steps in a method of producing a garment article according to an embodiment of the present invention.

Initially, as shown in FIG. 2A, a design pattern 202 for the garment article is prepared using a computer aided design (CAD) program 204 so similar software or program. Suitable software, such as that produced by Gerber, is well known in the art.

Figure 2B:
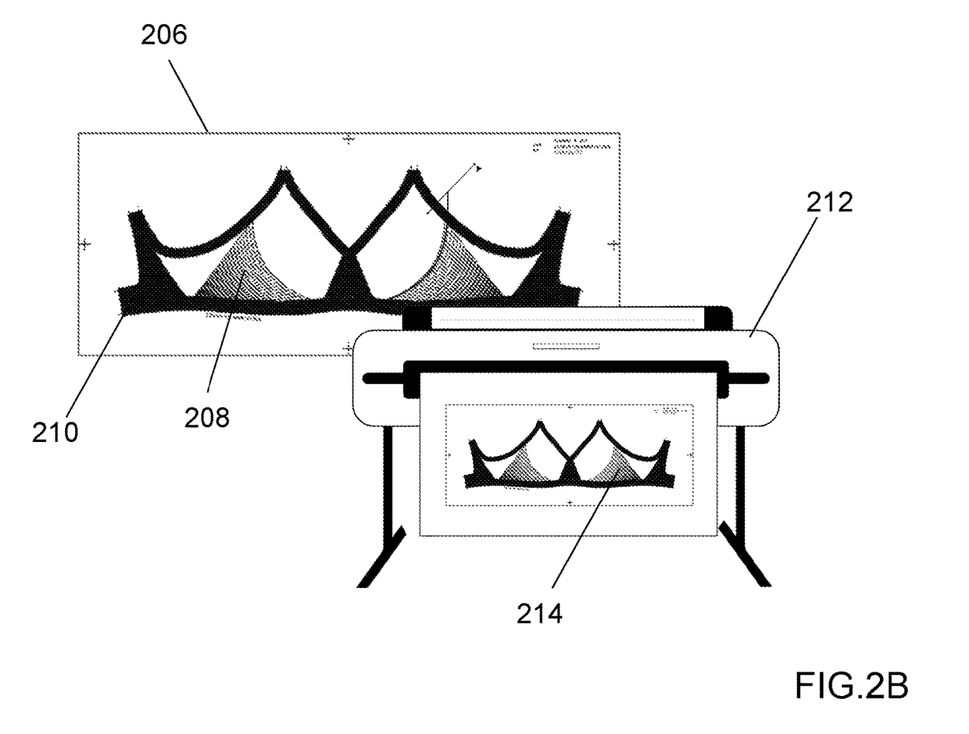

Then, as shown in FIG. 2B, a design pattern 206 for the elastomer layer is prepared. Suitable software for producing such designs is well known in the art. As is shown in FIG. 2B, in this embodiment, the design includes a graduated pattern 208 of elastomer below the cup area of the brassiere. In this embodiment, the graduated pattern 208 comprises a series of intersecting curved lines. The distance between lines varies in order to achieve a variation in the density of the pattern. As shown in FIG. 2B, the pattern is most dense towards the outer lower edge of the brassiere, and decreases in density towards the cup area of the brassiere. This variation enables the applied silicone to have a graduated arrangement thereby enabling a variation in the area density of the elastomer on the fabric layer across the region of fabric to which it is applied. As such, the applied elastomer provides support to the breast, while maintaining comfort. As shown in FIG. 2B, the design pattern for the elastomer layer also includes solid elastomer parts 210 which form the edges of the brassiere and the ends of the wings close to the closure. The design pattern 206 for the elastomer layer is then output to a cutting plotter 212 to provide a blocking stencil 214 for screen printing the elastomer layer.

Figure 2C:
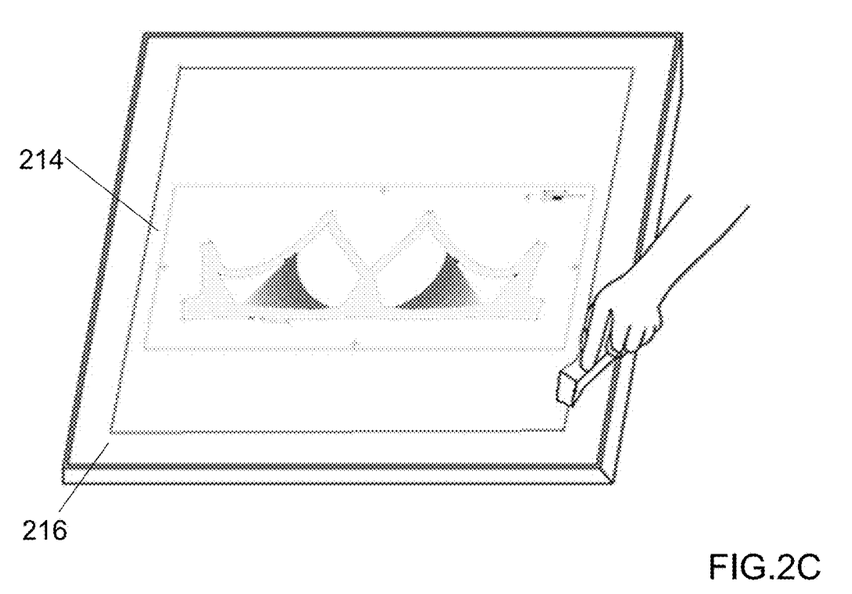

As shown in FIG. 2C, the blocking stencil 214 is aligned with a fabric substrate 216 which carries the design pattern 202 for the garment article.

Figure 2D:
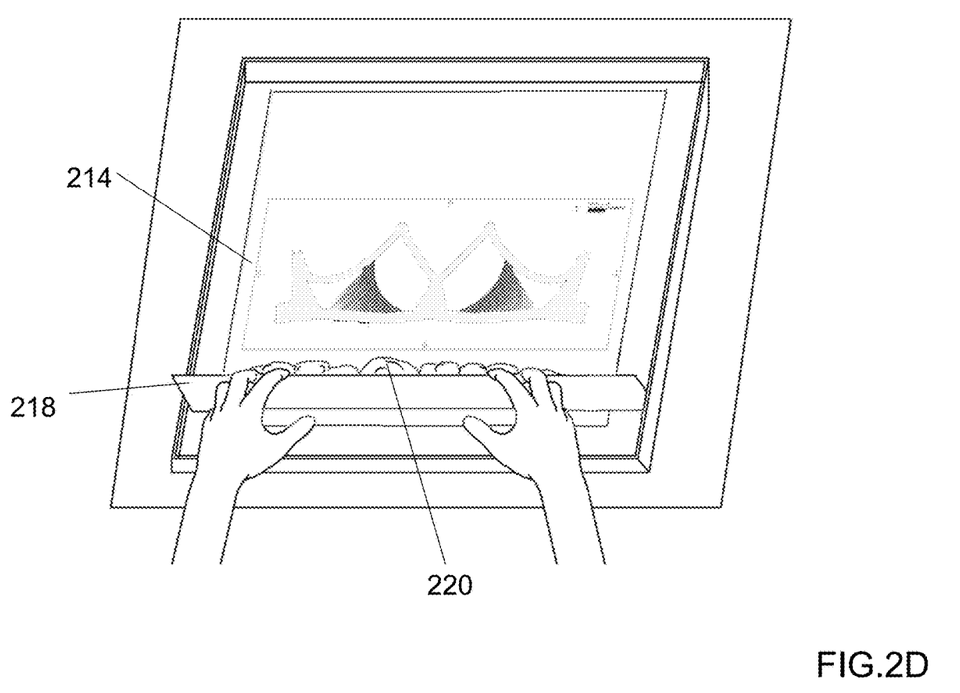

Then, as shown in FIG. 2D, the blocking stencil 214 is used to screen print the design pattern 206 for the elastomer layer on the fabric substrate 216. A squeegee 218 is used to apply an elastomer 220 such as silicone to the fabric substrate 216 using the blocking stencil 214. In an embodiment, silicone is used for the elastomer 220 and the viscosity of the deposited silicone is approximately 100,000 cps.

The deposited silicone is applied in its wet form to a surface of the fabric substrate, as shown in FIG. 2D. In an embodiment, the bonding of the silicone achieves an area density in the range 50-250 gsm of silicone bonded to the fabric. By applying the silicone in its wet form to the surface of the fabric, a temporary bond occurs between the fabric and the silicone ensuring that it remains in place prior to curing. Note that that the fabric substrate should be free of silicone finishes in order to ensure proper adherence to the substrate via cross links generated during curing.

Figure 2E:
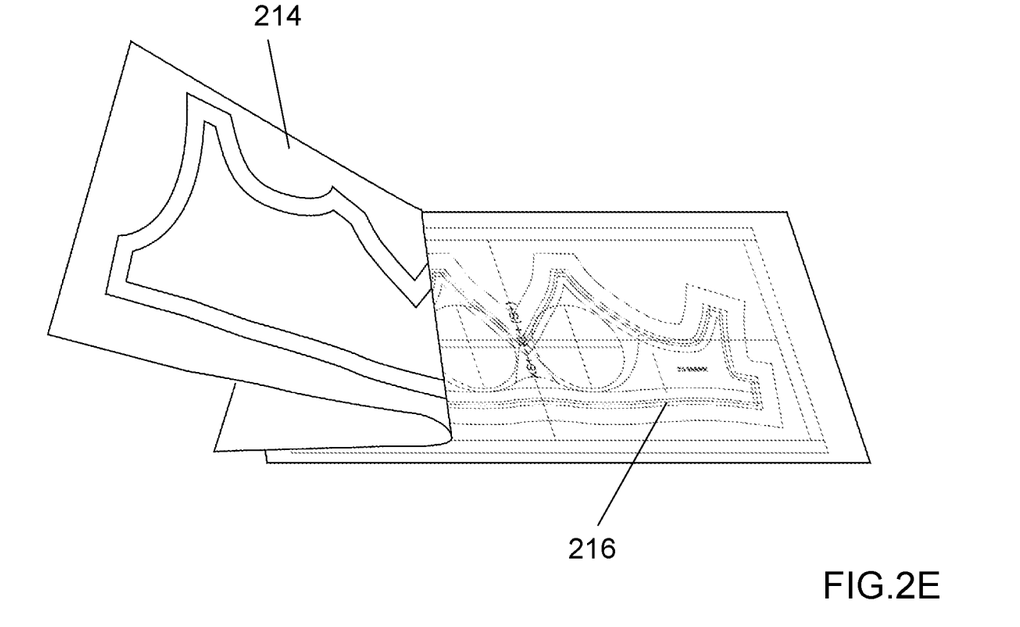

As shown in FIG. 2E, the blocking stencil 214 is removed from the fabric substrate 216 leaving the elastomer on the fabric substrate 216 in the pattern defined by the design pattern 206 for the elastomer layer.

In some embodiments, the elastomeric material (silicone, in the present embodiment) may be pigmented, thereby creating a visible design on the fabric, in order to enhance the appearance of the garment.

Figure 2F:
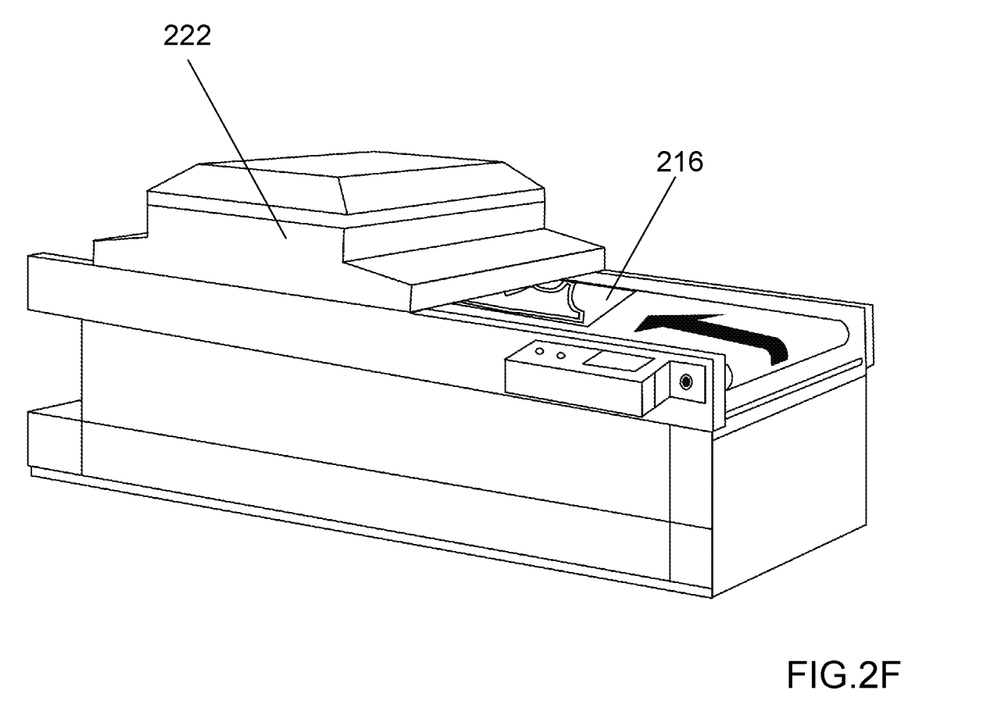

The fabric substrate 216 with the bonded silicone is then cured. In the present embodiment, this is done using an infra-red (IR) dryer 222, as shown in FIG. 2F. In an embodiment, following curing of the graduated silicone, the Peel bond value of the silicone is greater than 300 grams.

Figure 2G:
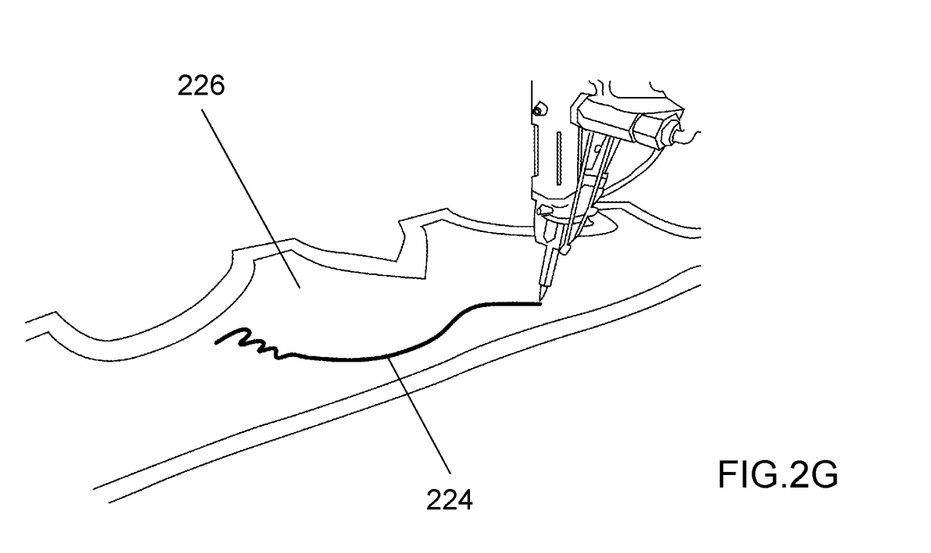

Subsequently, as shown in FIG. 2G, an elastomer such as silicone is further applied to the garment article by extrusion. In the embodiment of FIG. 2G, this elastomer silicone is deposited to form an underwire portion 224 below the cup region 226 of the brassiere.

In this embodiment, additional silicone is also extruded along the wings of the brassiere to form the supporting ribs which are shown in FIG. 1.

Figure 2H:
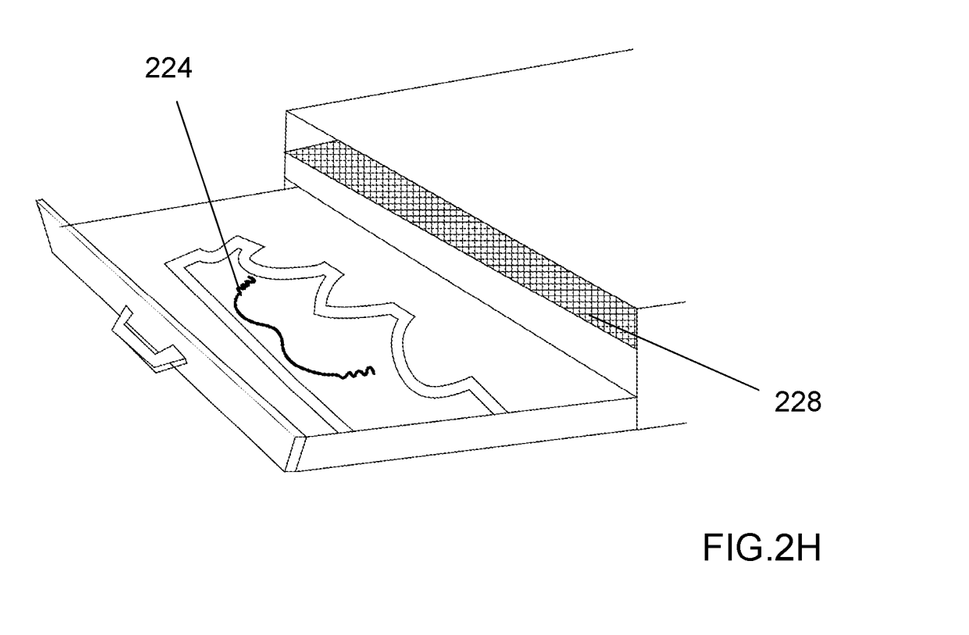

The extruded elastomer is then flocked as shown in FIG. 2H. In this embodiment, the flock is applied by electrostatic flocking. Typically, in electrostatic flocking, charged flock fibres are applied onto the elastomeric portions, such that one end of each of the flock fibres is attached to the extruded elastomeric portions. The charged flock fibres are aligned perpendicularly (or at any other angle) to the extruded elastomeric portions under an electrostatic field provided by a charged electrode screen 228. The flocking gives a dense pile finish to the composite component. As will be appreciated, any suitable methods to form the flock layer on the extruded elastomeric portions may be used.

Note that there is a risk of damage to flock occurring during dry moulding processes (see below) therefore the flocking material must be chosen carefully. In this embodiment, nylon is chosen as the flocking material due to its superior soft hand feel.

It is important that the garment is not left for too long after application of the extruded elastomer before flocking. Otherwise, the elastomer will begin to cure and the flock will not adhere sufficiently.

Figure 2I:
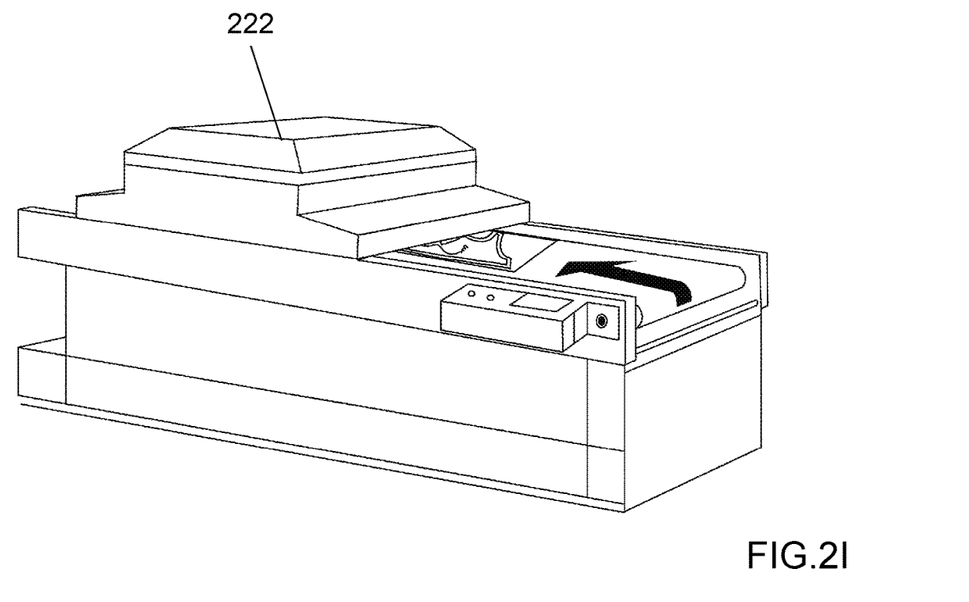

The extruded silicone is subsequently cured as shown in FIG. 2I, thereby adhering both the extruded silicone and the flock to the fabric. In an embodiment, the substrate to which silicone has been applied is sent through a heated chamber. In an embodiment, the heat energy is provided by an infra-red (IR) dryer 222 as shown in FIG. 2I. In an embodiment, the temperature of the heated chamber lies in the range 100° C.-200° C. and the curing time lies in the range 20 seconds to 120 seconds.

Figure 2J:
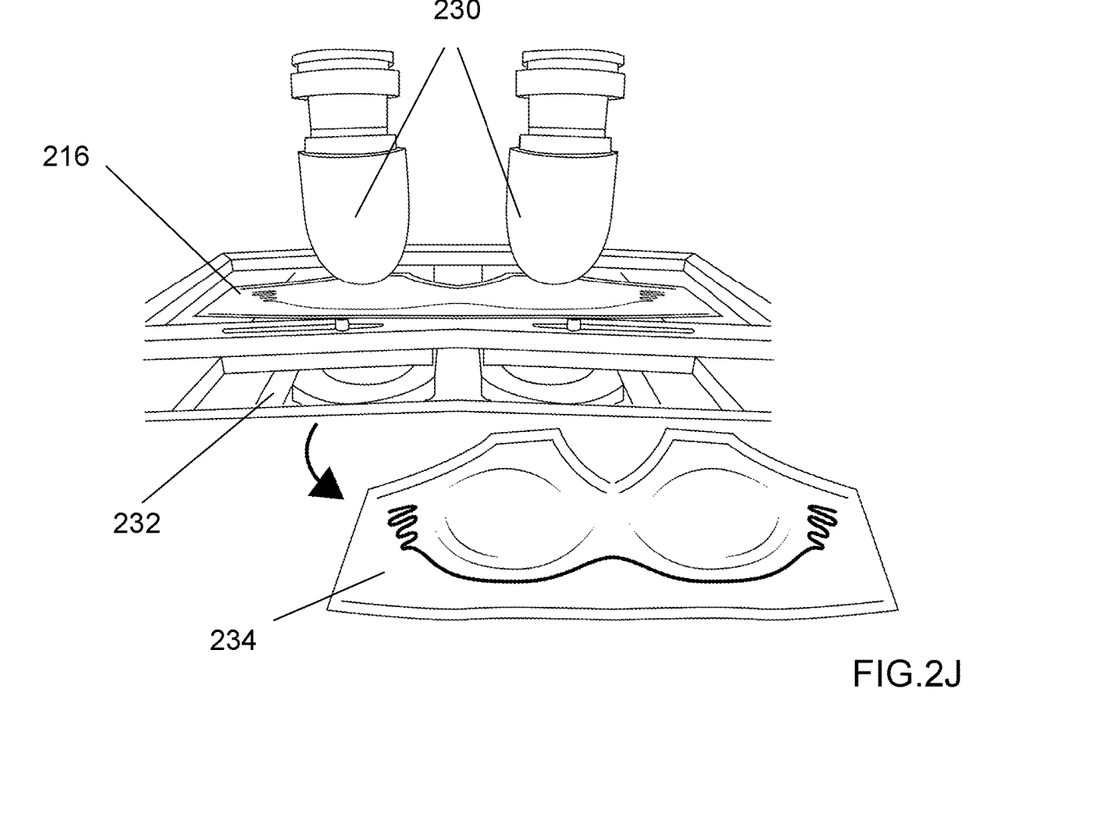

Next, the fabric substrate is moulded into shape using dry moulding. The substrate 216 is placed between a pair of mould heads 230 and a frame 232. In this embodiment, the cup area of the brassiere is moulded in this way. This provides the garment article 234

Note that correct alignment of the fabric substrate for dry moulding with respect to the extruded and patterned silicone is important in order for the relative positioning of the different features to be correct and for the garment to perform the desired support.

Further (as noted above) it is important that the dry moulding conditions employed are compatible with the flock applied to the elongate elastomer layer in order to avoid flock damage during the dry moulding process.

Finally, the garment article 234 is trimmed as necessary and fasteners, such as hook and eye fasteners, are added to the garment article, as appropriate.

As described above, and shown in FIG. 2G, in embodiments of the present invention, an underwire is provided as an extrusion of elastomer such as silicone. Various configurations of the underwire are envisaged as shown in FIG. 3.

Figure 3:
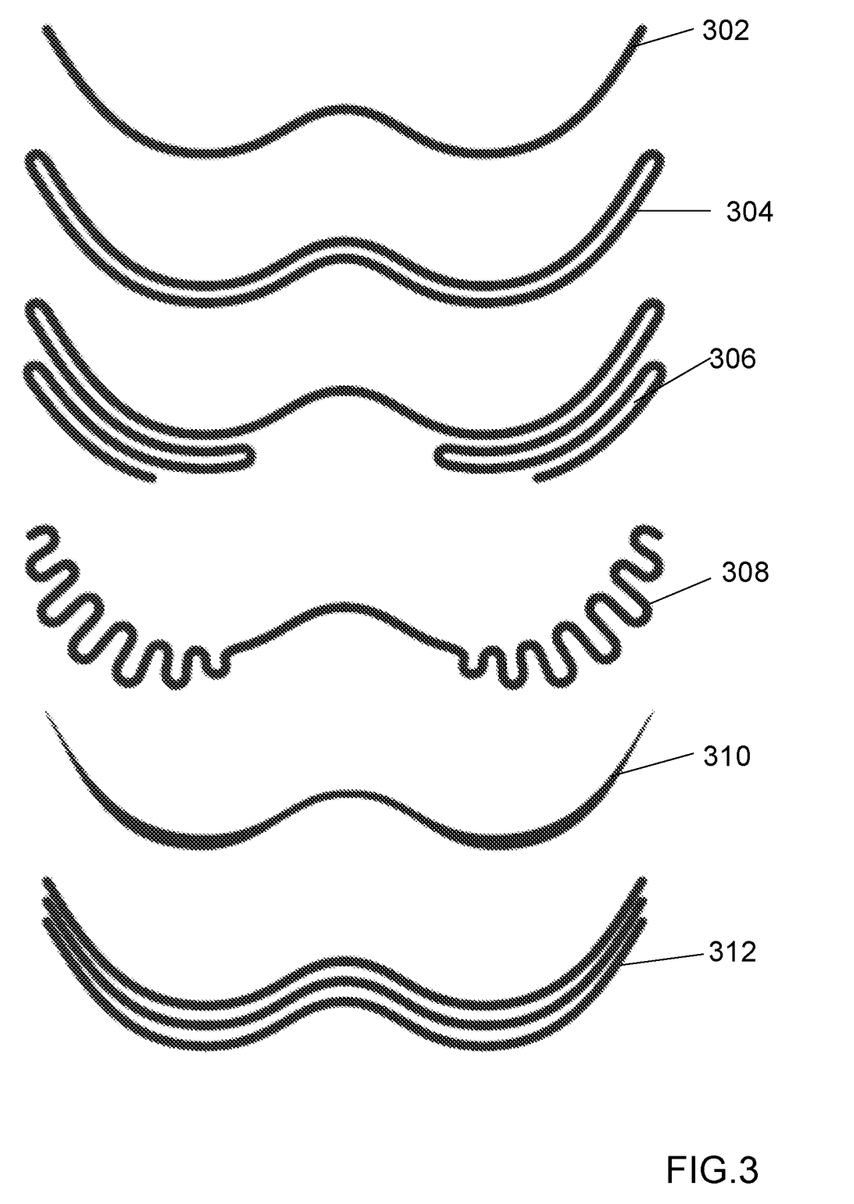
FIG. 3 shows example shapes and patterns for a deposition to create an underwire in to embodiments of the present invention.

FIG. 3 shows example shapes and patterns for a deposition to create an underwire in embodiments of the present invention. The underwire may be provided as a single uniform extrusion of elastomer 302. The underwire may be provided as two extrusions running in parallel and joined to form a loop 304. The extrusion may be provided as a line which double back on itself 306 to provide increased rigidity in certain areas such as under the bra cups. The extrusion may be provided in an oscillating pattern 308 in certain locations such as under the bra cups. The extrusion may have a varying thickness 310 with an increased thickness being provided under the bra cups. The extrusion may be provided as multiple lines 312. As will be apparent to the skilled person, the configuration of the extrusion may be varied to provide the desired rigidity in different areas.

The skilled person will appreciate that several permutations of the above features are possible according to embodiments. According to embodiments, all or only some of the features described above may be combined. Likewise, particular features may be omitted or adapted according to the requirements of the manufacturer or end-user. The skilled person will appreciate that the creation of a garment with some or all of the features described above is non-trivial and requires the combination of a number of different technologies.

Whilst the foregoing description has described exemplary embodiments, it will be understood by those skilled in the art that many variations of the embodiments can be made. The features described above can, of course, be combined according to requirements. All permutations of the above features are possible according to embodiments.

The invention claimed is:

1. A brassiere comprising:
   two bra cups;
   two bra wings, each extending from a side of a respective one of the bra cups; and
   a fabric layer,
   a first layer of elastomer, the first layer of elastomer provided in a graduated pattern on a region of the bra cups and a region of the bra wings such that the area density of the elastomer gradually varies across the region of the bra cups and the region of the bra wings, and
   a second layer of elastomer bonded to a surface of the fabric layer, wherein the second layer of elastomer forms an extruded elastomeric underwire and a pair of elastomeric supporting ribs,
   wherein the extruded elastomeric underwire is formed as an elongate portion of elastomer that extends continuously along respective bottom portions of the two bra cups, and the pair of elastomeric supporting ribs extend respectively along the two bra wings to increase the rigidity of the bra wings in a vertical direction,
   wherein at least a portion of the fabric layer is molded to form the bra cups and the first layer of elastomer is bonded to a surface of the fabric layer in the region of the bra cups.

2. The brassiere according to claim 1, wherein the first layer of elastomer is provided as a mesh or a foam.

3. The brassiere according to claim 1, wherein the first layer of elastomer is arranged in the form of a pattern, wherein the graduated pattern gradually varies across the region of the bra cups such that a ratio of a proportion of the surface to which elastomer is bonded to a proportion of the surface to which no elastomer is bonded varies across the region of the bra cups.

4. The brassiere according to claim 1, wherein the elastomer comprises silicone.

5. The brassiere according to claim 1, further comprising a layer of flock covering the first layer of elastomer.

6. The brassiere according to claim 5, wherein the flock comprises nylon.

7. The brassiere according to claim 1, wherein the elongate portion of elastomer is configured to provide additional support for breasts of a wearer.

8. The brassiere according to claim 1, wherein the second layer of elastomer comprises silicone.

9. The brassiere according to claim 1, further comprising a layer of flock covering the second layer of elastomer.

\* \* \* \* \*